US012782558B2

(12) United States Patent
Kim

(10) Patent No.: US 12,782,558 B2
(45) Date of Patent: Nov. 3, 2026

(54) APPARATUS FOR GENERATING SURROUNDING MAP CORRESPONDING TO SURROUNDING OBJECT AND METHOD THEREFOR

(71) Applicant: HYUNDAI MOBIS CO., LTD., Seoul (KR)

(72) Inventor: Kang Hee Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/222,802

(22) Filed: May 29, 2025

(65) Prior Publication Data

US 2026/0063797 A1 Mar. 5, 2026

(30) Foreign Application Priority Data

Sep. 5, 2024 (KR) ........................ 10-2024-0120528

(51) Int. Cl.

| | |
|---|---|
| ***G07C 5/00*** | (2006.01) |
| ***G01S 15/42*** | (2006.01) |
| ***G01S 15/89*** | (2006.01) |
| ***G01S 15/931*** | (2020.01) |
| ***G07C 5/02*** | (2006.01) |
| ***G07C 5/04*** | (2006.01) |
| ***G07C 5/08*** | (2006.01) |

(52) U.S. Cl.

CPC .............. *G01S 15/89* (2013.01); *G01S 15/42* (2013.01); *G01S 15/931* (2013.01)

(58) Field of Classification Search

CPC ......... G01S 15/89; G01S 15/42; G01S 15/931

See application file for complete search history.

(56) References Cited

U.S. PATENT DOCUMENTS

| | | | | |
|---|---|---|---|---|
| 2015/0323668 | A1* | 11/2015 | Heimberger | G01S 15/66 367/99 |
| 2017/0227640 | A1* | 8/2017 | Nomura | G08G 1/166 |
| 2017/0355307 | A1* | 12/2017 | Ha | G08G 1/168 |
| 2019/0266418 | A1* | 8/2019 | Xu | G06V 10/44 |
| 2019/0332118 | A1* | 10/2019 | Wang | G06T 7/11 |
| 2021/0165413 | A1* | 6/2021 | Guo | G01S 17/931 |
| 2021/0185205 | A1* | 6/2021 | An | B60R 1/27 |
| 2022/0161784 | A1* | 5/2022 | Lee | B60W 30/06 |
| 2024/0201368 | A1* | 6/2024 | Schmid | G01S 15/876 |
| 2025/0078532 | A1* | 3/2025 | Zhao | G06V 20/588 |
| 2025/0236289 | A1* | 7/2025 | Gunbatar | B60W 30/09 |

* cited by examiner

*Primary Examiner* — Kito R Robinson
*Assistant Examiner* — Anthony Gabriel Mora
(74) *Attorney, Agent, or Firm* — Morgan Lewis & Bockius LLP

(57) ABSTRACT

An apparatus for generating a map around a moving object through multi-object recognition using a plurality of ultrasonic sensors is disclosed. The apparatus includes: a sensor unit detecting an object around the moving object; and a processor operatively connected to the sensor unit and configured to generate a mask corresponding to an object around the moving object using data acquired by the sensor unit. The processor is configured to generate a fusion mask using a first mask acquired using each ultrasonic sensor and a prediction mask (hereinafter referred to as a second mask) corresponding to the first mask acquired in a previous cycle; and correct a fusion mask having a common region with the first mask from among fusion masks for all ultrasonic sensors of the sensor unit that has a common region with the first mask.

15 Claims, 15 Drawing Sheets

APPARATUS FOR GENERATING SURROUNDING MAP CORRESPONDING TO SURROUNDING OBJECT AND METHOD THEREFOR

This application claims the benefit of Korean Patent Application No. 10-2024-0120528, filed on Sep. 5, 2024, which is hereby incorporated by reference as if fully set forth herein.

BACKGROUND OF THE DISCLOSURE

Field of the Disclosure

The embodiments of the present disclosure relate to an apparatus for generating a surrounding map corresponding to a surrounding object and a method thereof, and more particularly to an apparatus and method for generating a surrounding map for a surrounding object required for parking control.

Discussion of the Related Art

Ultrasonic sensors, which are mounted on front and rear bumpers of a vehicle or other ultrasonic sensors mounted on a vehicle body, are important components of a parking assistance system (PAS) or rear parking sensors. Ultrasonic sensors may detect obstacles located at a rear side or a lateral side of the vehicle, and may help a driver avoid collision when the driver is parking the vehicle.

The ultrasonic sensor periodically transmits high-frequency sound waves (ultrasonic waves). When the transmitted ultrasonic signal collides with (hits) an obstacle, the ultrasonic sensor receives a signal reflected from the obstacle. Direct waves may refer to signals obtained when the corresponding ultrasonic sensor transmits signals and directly receives signals reflected from the obstacle. Indirect waves may refer to signals obtained when the corresponding ultrasonic sensor transmits signals and another ultrasonic sensor receives the signals reflected from the obstacle. If there are two ultrasonic sensors on both sides of the ultrasonic sensor, the ultrasonic sensor can obtain one direct wave and two indirect waves. The ultrasonic sensor may estimate the position of the reflection object (i.e., the obstacle) based on two intersections of the one direct wave and the two indirect waves. The intersection of the direct wave and the indirect waves may refer to, rather than the intersection of the actual signals, the intersection of a circle having a radius that is half a distance obtained based on a time of flight (TOF) of the direct wave and an ellipse formed by a set (aggregate) of points corresponding to distances from two focal points (two foci). In the ellipse, the positions of two ultrasonic sensors (i.e., a first sensor transmitting ultrasonic waves and a second sensor receiving the ultrasonic waves) are set to two focal points, and the distances from the two focal points are obtained based on a time of flight (TOF) of indirect waves. In the present specification, "intersection of direct wave and indirect waves" is simply referred to as "intersection".

The TOF value (hereinafter referred to as ultrasonic sensor data) acquired by the ultrasonic sensor is used to estimate the position of an obstacle, so that the accuracy or reliability of the data must be guaranteed. If there is noise in the sensor data, the position of the obstacle based on the sensor data is likely to be incorrect.

The present disclosure proposes a method for generating a surrounding map for obtaining information on an obstacle (i.e., an object around a moving object). In particular, the present disclosure relates to a method using an ultrasonic sensor, and proposes a method for generating a surrounding map from which noise caused by ultrasonic sensor data is removed.

SUMMARY OF THE DISCLOSURE

An object of the present disclosure is to provide an apparatus and method for generating a surrounding map corresponding to a surrounding object.

Technical subjects to be solved by the present disclosure are not limited to the above-mentioned technical solutions, and it should be noted that other technical subjects not described above can be understood by those skilled in the art from the description of the present disclosure below.

In accordance with an embodiment of the present disclosure, an apparatus for generating a map around a moving object through multi-object recognition using a plurality of ultrasonic sensors is disclosed. The apparatus includes: a sensor unit detecting an object around the moving object, wherein the sensor unit includes the plurality of ultrasonic sensors; and a processor operatively connected to the sensor unit and configured to generate a mask corresponding to the object around the moving object using data obtained by the sensor unit. The processor is configured to periodically obtain a first mask using a respective one of the plurality of ultrasonic sensors, generate a fusion mask using a first mask obtained in a current cycle and a second mask predicted using a first mask obtained in a previous cycle, for the respective one of the plurality of ultrasonic sensors; and correct a fusion mask having a common region with the first mask obtained in the current cycle from among fusion masks for all of the plurality of ultrasonic sensors.

In accordance with another embodiment of the present disclosure, a method for generating a map around a moving object through multi-object recognition using a plurality of ultrasonic sensors may include: obtaining a map including sensor data of a first ultrasonic sensor from among the plurality of ultrasonic sensors and one or more fusion masks obtained from the plurality of ultrasonic sensors; obtaining a first mask using the sensor data of the first ultrasonic sensor; and correcting a fusion mask having a common region with the first mask from among the fusion masks obtained from the plurality of ultrasonic sensors, wherein the map includes a first fusion mask obtained from the first ultrasonic sensor, and the first fusion mask is generated by fusing a measured mask obtained using the sensor data of the first ultrasonic sensor and a predicted mask obtained from the measured mask.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Figure 1:
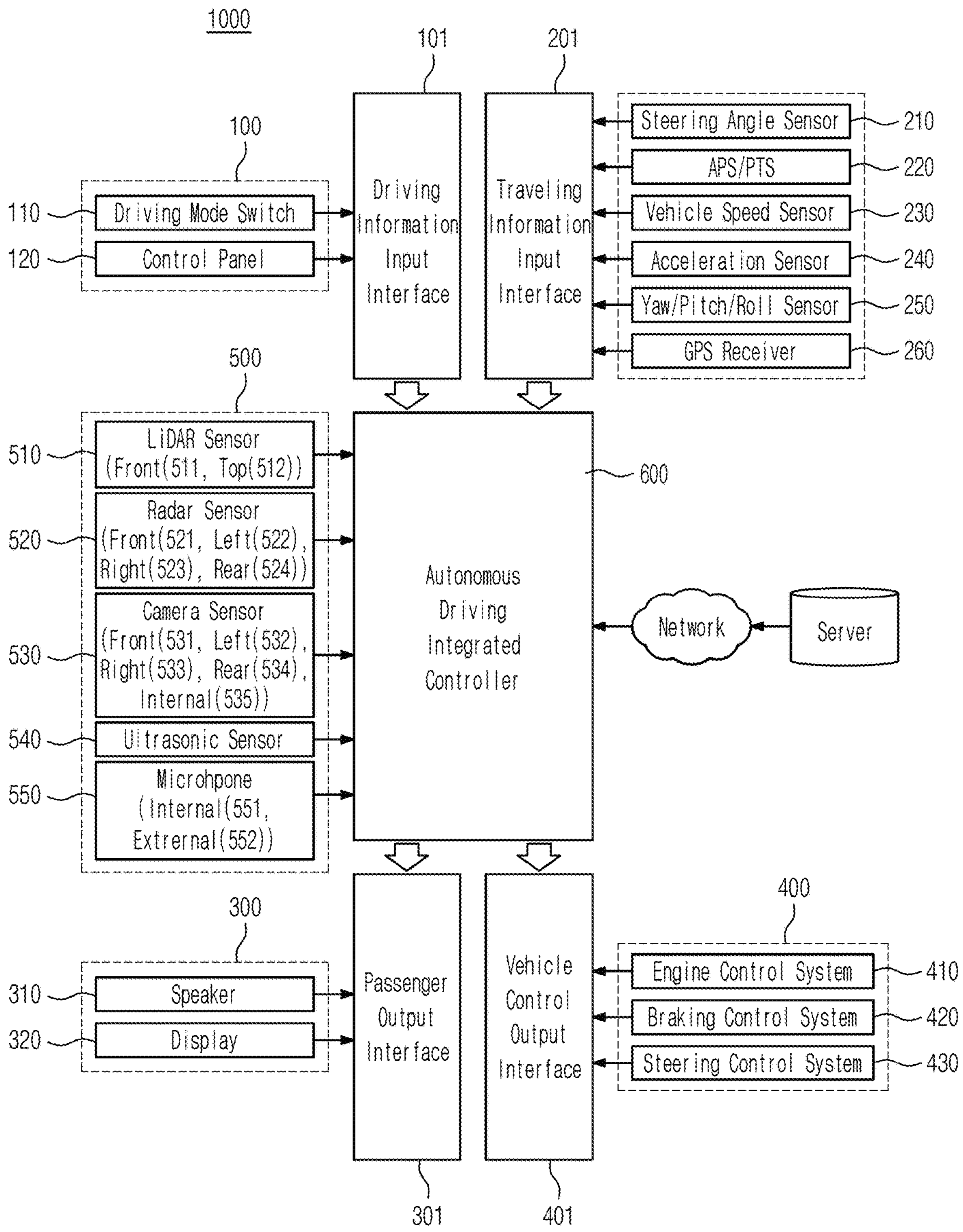
FIG. 1 is an overall block diagram illustrating an autonomous vehicle to which an autonomous driving apparatus can be applied.

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part “includes” an element, it means that the part may further include another element rather than excluding another element unless otherwise mentioned.

In addition, in the specification, “occupant”, “passenger”, “driver”, “user”, etc. are mentioned for description of the present disclosure, and may be used interchangeably therewith.

Figure 2:
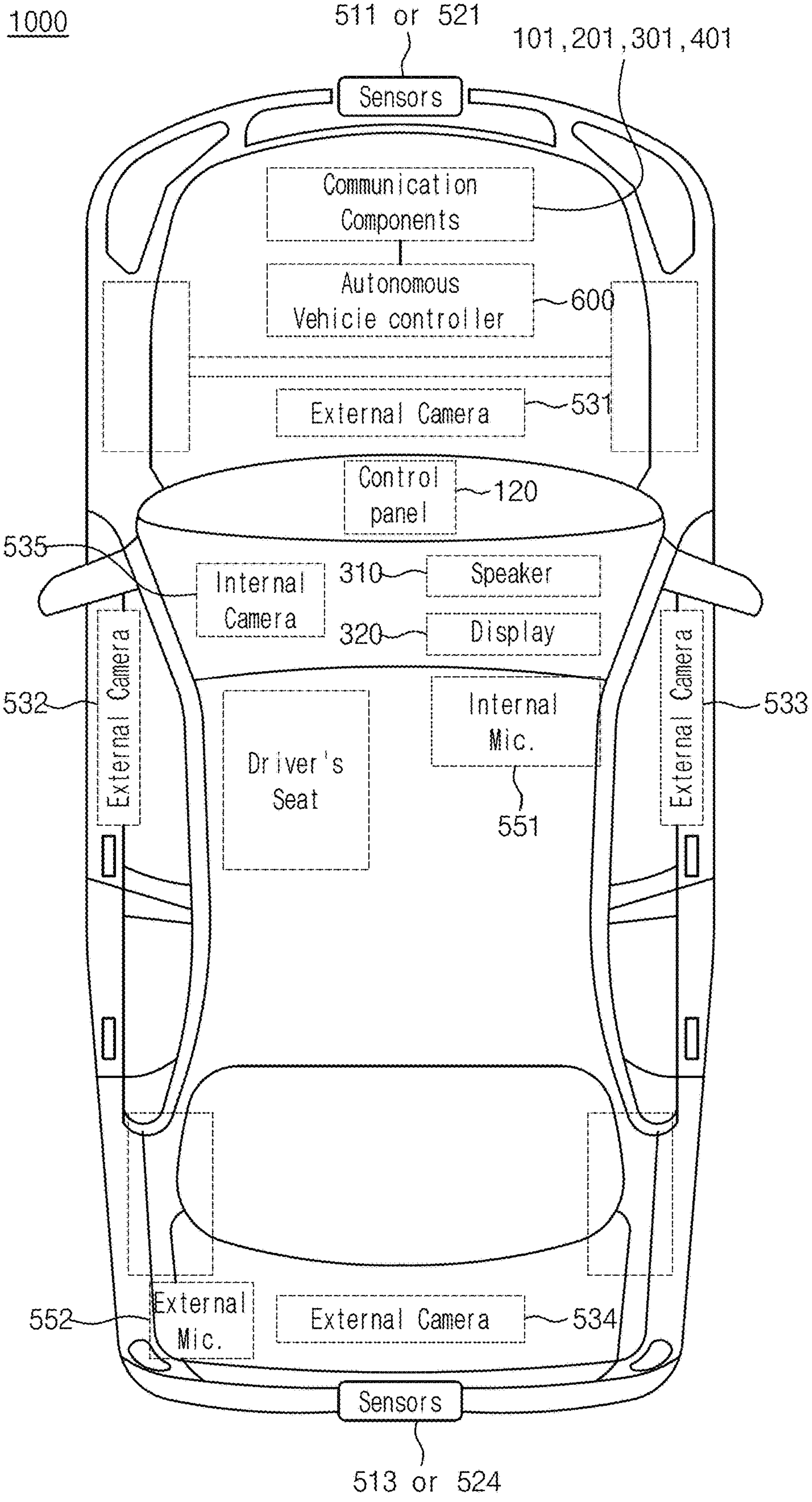
FIG. 2 is a schematic diagram illustrating an example vehicle to which an autonomous driving apparatus is applied.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LIDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
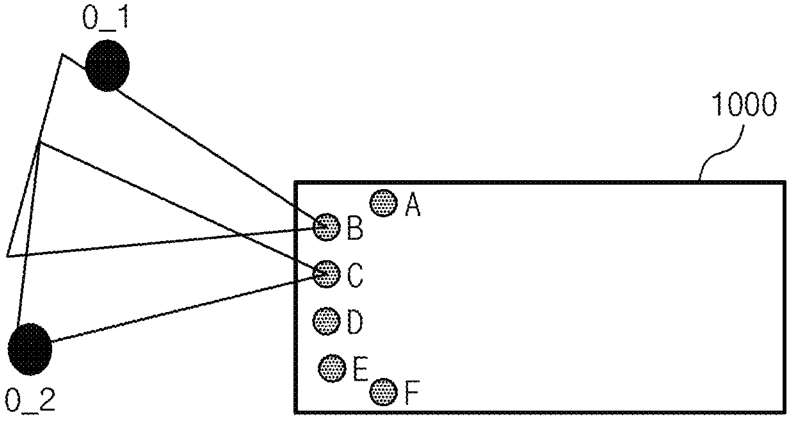
FIG. 3 is a diagram illustrating a field of view (FOV) of an ultrasonic sensor and obstacles according to the present disclosure.

FIG. 3 is a diagram illustrating a field of view (FOV) of an ultrasonic sensor and obstacles according to the present disclosure.

The conventional method for detecting objects around a moving object 1000 using an ultrasonic sensor has several problems. In the present specification, obstacles, people, etc. around the moving object 1000 are referred to as "objects."

Figure 4:
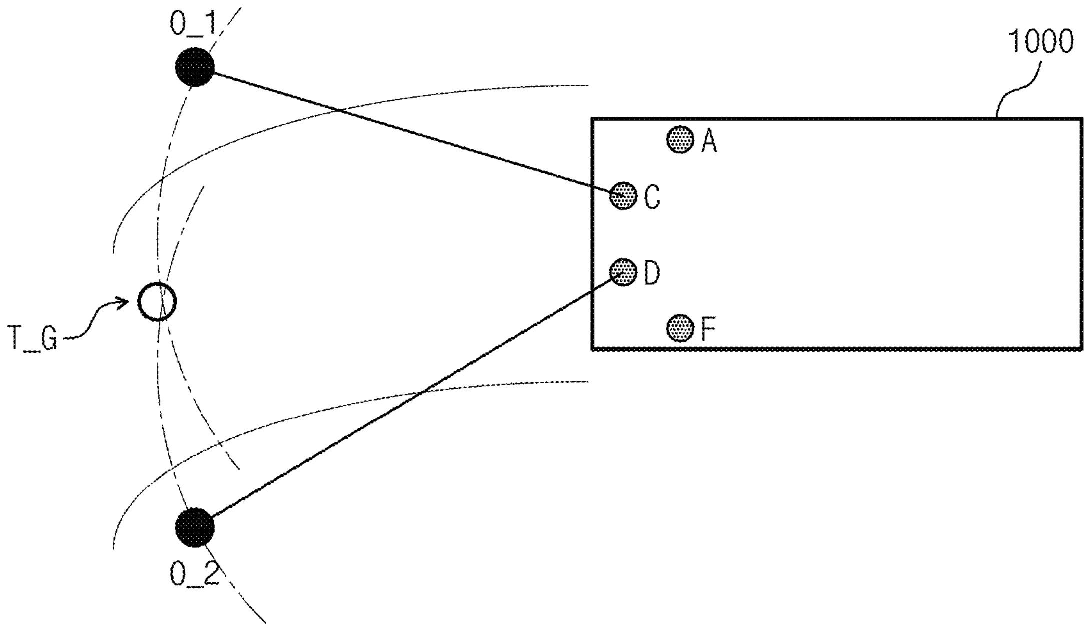
FIG. 4 is a diagram illustrating ghost targets in object detection using a conventional ultrasonic sensor.

Conventionally, it was assumed that two adjacent sensors have recognized the same object. Accordingly, as shown in FIG. 3, different objects (O_1, O_2) are actually present, but according to the above assumption, a false target (T_G) may be recognized as shown in FIG. 4.

However, since the region where the FOVs of the two adjacent ultrasonic sensors (B, C) (see FIG. 3) overlap each other is small in size, the probability of recognizing a single object through ultrasonic waves of the two ultrasonic sensors is bound to be low. In addition, since the shapes of the components equipped with ultrasonic sensors (e.g., a bumper of a vehicle) are different for each moving object, the degree of FOV overlap is also different for each moving object, making it difficult to apply uniform logic or control to the ultrasonic sensors.

However, when a single ultrasonic sensor transmits ultrasonic waves, the direct and indirect waves updated by such transmission of the ultrasonic waves have a very high probability of detecting the same object. This is because the FOV is identical or single, and the distance between the direct wave reflection point and the indirect wave reflection point is small. Therefore, when an object is detected by a single ultrasonic wave or a single ultrasonic sensor, the probability of false recognition is reduced.

In the ultrasonic sensor, a direct wave refers to an ultrasonic wave that is first transmitted from the corresponding ultrasonic sensor, reflected from the object, and finally directly received by the corresponding ultrasonic sensor. In addition, in an ultrasonic sensor, an indirect wave refers to an ultrasonic wave obtained when ultrasonic waves transmitted from the corresponding ultrasonic sensor are reflected and received by another adjacent ultrasonic sensor. The TOF (time of flight) that can be measured by a single ultrasonic sensor is obtained based on 1 direct wave and 2 indirect waves.

In addition, when generating the coordinates of an object with ultrasonic waves transmitted from different ultrasonic sensors, a false recognition probability may exist. Therefore, when one fused mask (hereinafter referred to as a "fusion mask") is generated based on a mask (hereinafter referred to as a "first mask") acquired by TOF of a single ultrasonic sensor and another mask (hereinafter referred to as a "second mask") predicted based on driving information of a moving object, a more accurate position of an object, a distance to an object, and the like may be obtained.

In the present specification, "mask" means a region indicating the position of an object around a moving object, and it can be recognized that an object exists in the mask.

In addition, by collecting all fusion masks acquired from a single ultrasonic sensor and re-fusing the collected fusion masks, that is, by re-fusing the fusion masks acquired from multiple ultrasonic sensors, more accurate positions of the objects, distances to the objects, etc. can be obtained.

Hereinafter, the reason why sensor data based on a single ultrasonic wave must be used, single ultrasonic sensor fusion, and multiple ultrasonic sensor fusion will be described in detail.

Figure 5:
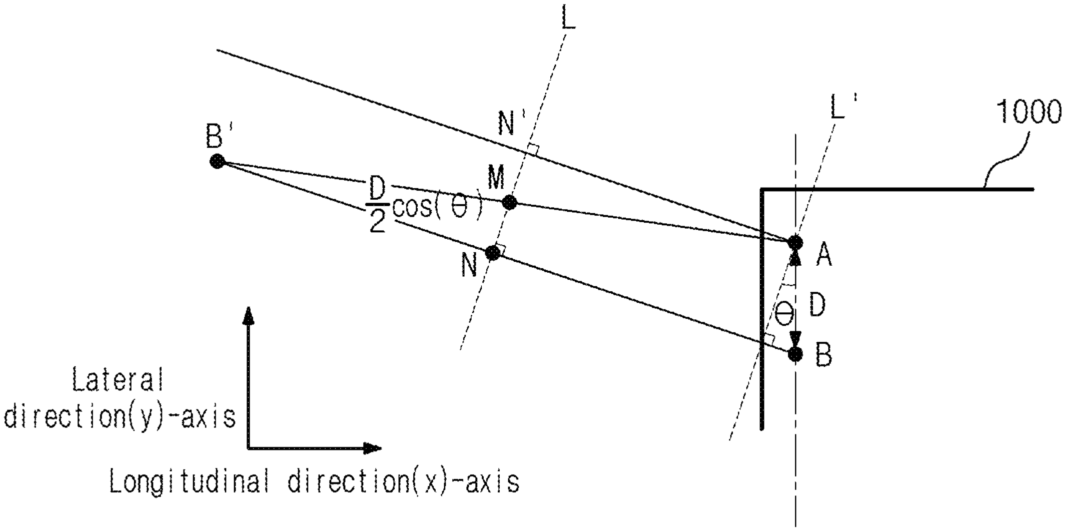
FIG. 5 is a diagram illustrating a method for object detection using a single ultrasonic sensor according to the present disclosure.

FIG. 5 is a diagram illustrating a method for object detection using the single ultrasonic sensor according to the present disclosure.

In one ultrasonic sensor, one direct wave and two indirect waves are updated. The direct wave is modeled as a circle, and the indirect wave is modeled as an ellipse.

A circle has a radius that is the length corresponding to the direct wave TOF obtained when the ultrasonic sensor (B) transmits ultrasonic waves, and the positions of the ultrasonic sensors (A, B), each of which has a length corresponding to the indirect wave TOF while serving as a radius of an ellipse, are used as focal points (foci) of the ellipse. Here, it is assumed that a tangent line between the circle and the ellipse is L.

At this time, when transmitting ultrasonic waves from the ultrasonic sensor B, the intersection of the updated direct wave (B→N→B) and the indirect wave (B→M→A) indicates any particular object with a high probability.

This is because, assuming that a point object with a volume of 0 is used, it is obvious that the intersection of the direct wave and the indirect wave is the position of the object. This is because the FOV of the updated direct wave and the FOV of the indirect wave exactly match each other when transmitting ultrasonic waves from one ultrasonic sensor. In addition, even if an object with a volume is used, the direct wave reflection point and the indirect wave reflection point are not independent but dependent.

In an object with a finite volume, the distance between the direct wave reflection point and the indirect wave reflection point is finite, and even when extended to an object with an infinite volume, a distance (MN) between the direct wave reflection point and the indirect wave reflection point corresponds to the value obtained when the distance (D) between the ultrasonic sensors is divided by 2. Therefore, the direct wave reflection point (N) and the indirect wave reflection point (M) are dependent on each other, and the probability of being recognized as one object is very high.

In addition, even if the same object is recognized in a situation where the distance between the reflection points of the ultrasonic waves that are updated after being transmitted from one ultrasonic sensor is D/2 and the distance between the reflection points of the ultrasonic waves updated after being transmitted from two ultrasonic sensors is D, such ultrasonic waves are updated after being reflected from other parts of the object, so that object recognition using intersection methods such as triangulation may have large errors.

Therefore, when the ultrasonic sensor B transmits ultrasonic waves, there is a high probability that an object will be located near the intersection of direct waves (B→N→B) and indirect waves (B→M→A).

In conclusion, assuming that six ultrasonic sensors are installed at the end of a moving object, a combination with a high probability of "seeing one object" from among the combinations of six direct waves and ten indirect waves is a combination of direct waves and indirect waves updated when signals are transmitted through a single ultrasonic sensor.

A method for object recognition using a single ultrasonic sensor will be described in detail.

When signals are transmitted through a single ultrasonic sensor, it is concluded that there is a very high probability that a part of the target exists near the intersection of the updated direct waves and the updated indirect waves.

At this time, a region where an object is highly likely to exist at the intersection of the direct waves and the indirect waves can be obtained. In other words, this region corresponds to a "first mask".

Figure 6:
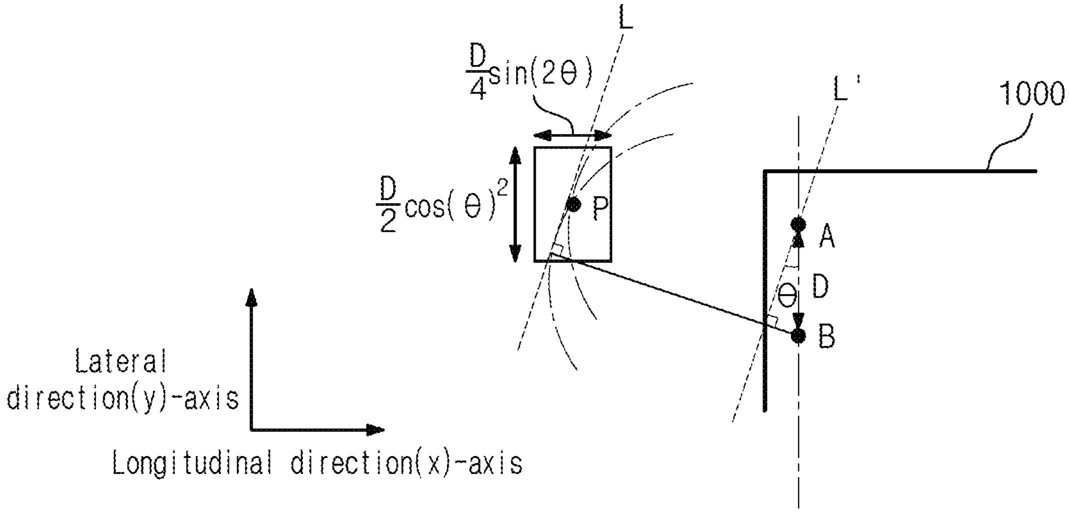
FIG. 6 is a diagram illustrating a mask for a detected object according to the present disclosure.

As shown in FIG. 6, the longitudinal and lateral distances of the direct wave reflection point and the longitudinal and lateral distances of the indirect wave reflection point can be calculated (Assuming an object having infinite volume—this is denoted by "L").

$$\text{Lateral distance of } MN = MN * \cos(\theta) = D/2 * \cos(\theta) * \cos(\theta) = D/2\cos(\theta)2$$

$$\text{Longitudinal distance of } MN = MN * \sin(\theta) = D/2 * \cos(\theta) * \sin(\theta) = D/4\sin(2\theta)$$

Accordingly, there is a high probability that the object is in a shaded rectangular region near the intersection (P) of the direct and indirect waves as shown in FIG. 6. Here, the shaded region corresponds to a "first mask".

That is, the region where an object can exist in the longitudinal direction can be approximated by points within a distance of D/4 from the intersection of the direct and indirect waves, and the region where an object can exist in the lateral direction can be approximated by points within a distance of D/2 from the intersection of the direct and indirect waves.

The above-described content mathematically describes that the ultrasonic sensor shows ultrasonic characteristics in which the lateral recognition value is less accurate than the longitudinal recognition value.

At this time, the probability that an object exists in the corresponding region can be calculated by comparing the second mask of the next time point (cycle) predicted based on the first mask with the first mask of the next time point (cycle). That is, if the positional difference between the two masks is within a preset range, it can be determined that an actual object exists within the two masks. For example, if the longitudinal difference between the second mask and the first mask is within "D/4*sin(2θ)" and the lateral difference between the second mask and the first mask is within "D/2*cos(θ) 2", it can be determined that the probability that an actual object exists in the corresponding region is very high.

Experimentally, in a situation where noise is forcibly applied to the ultrasonic sensor, the probability that the difference between the first mask and the second mask indicating the predicted value based on the first mask is within the corresponding range was measured to be very low. In other words, noise can be removed through the above determination.

Experimentally, it was confirmed that if the difference between the first mask and the second mask indicating the predicted value based on the first mask shows a difference within the error range twice or more times, the probability of existence of the actual object was very high.

Figure 7:
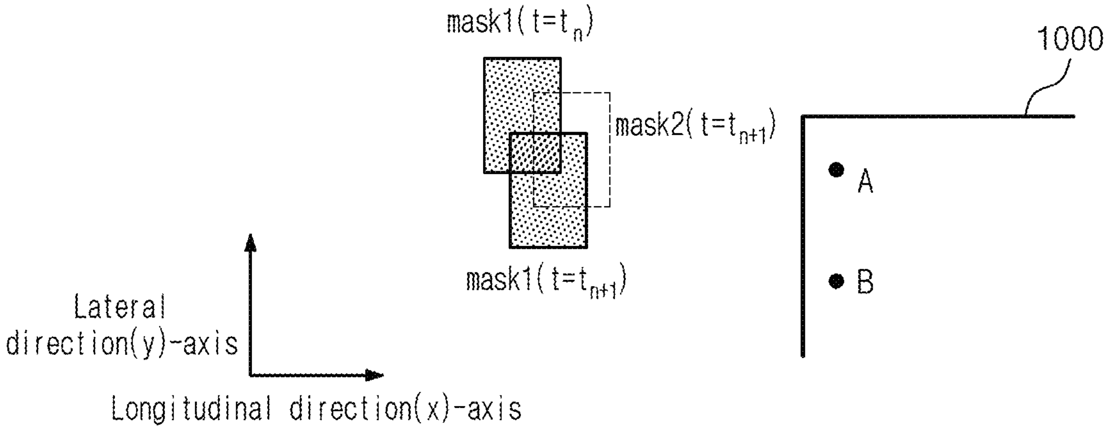
FIGS. 7 and 8 are diagrams illustrating masks and fusion of masks according to the present disclosure.
Figure 8:
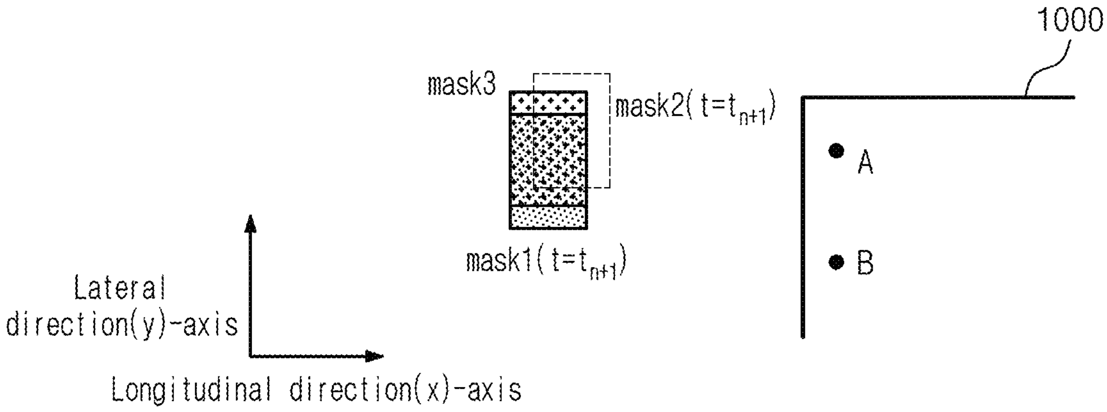

Therefore, according to the present disclosure, as shown in FIGS. 7 and 8, single ultrasonic sensor fusion can be performed, and if the difference between the predicted mask (i.e. the second mask (mask2 (t=tn+1)) obtained based on the first mask (mask1 (t=tn)) obtained in the first cycle and the first mask (mask1 (t=tn+1)) obtained in the second cycle is within the error range, the first mask and the second mask are fused to generate a single mask. In FIG. 8, "mask3" represents a fusion mask using a single ultrasonic sensor.

At this time, the coordinates of the center point of the fusion mask can be determined as the horizontal coordinates of the center point of the first mask in the horizontal direction, and can also be determined as the center point of the longitudinal coordinates of the first mask and the longitudinal coordinates of the second mask in the vertical direction.

Additionally, the size of the fusion mask may be determined as the size of the larger mask from among the first mask and the second mask, or if the sizes of the first mask and the second mask are the same, the size of the fuse mask may be determined as the size of one of the two masks.

Based on the mobile object 1000 illustrated in FIG. 3, since there are 6 ultrasonic sensors at the rear side of the vehicle, there are a total of 10 indirect waves, so that a total of 10 first masks can be generated during one cycle. Accordingly, a maximum of 10 fusion masks can be acquired during one cycle.

Hereinafter, fusion through multiple ultrasonic sensors will be described.

A mask (first mask) acquired based on the direct and indirect waves of each ultrasonic sensor, a mask (second mask) predicted based on the first mask and the driving information of the mobile object, and a fusion (fusion mask) of the first and second mask has been described.

The fusion mask based on the direct and indirect waves of each ultrasonic sensor can be stored in a storage medium such as a memory.

Figure 9:
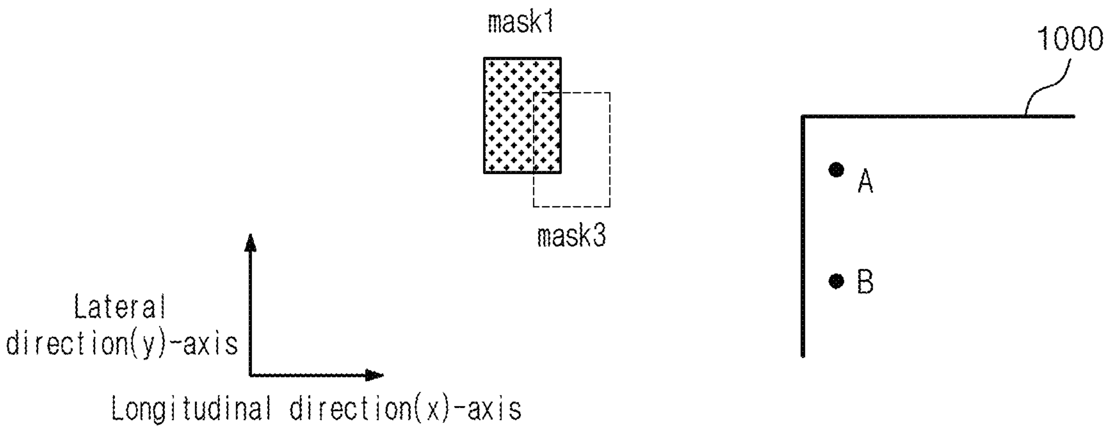
FIG. 9 is a diagram illustrating fusion using multiple ultrasonic sensors according to the present disclosure.

FIG. 9 is a diagram illustrating fusion using multiple ultrasonic sensors according to the present disclosure. Fusion through multiple ultrasonic sensors may use a first mask generated based on the direct or indirect waves of each ultrasonic sensor and a fusion mask acquired or generated by each of all ultrasonic sensors.

As described above, the first mask (mask1) is a measurement value obtained through direct and indirect waves of a specific ultrasonic sensor, and the third mask (mask3) is a fusion mask that is a result of fusion of the first mask obtained through direct and indirect waves of a specific ultrasonic sensor and the second mask predicted based on the first mask and driving information of the moving object.

Once the first mask is acquired, the position or size of the first mask can be compared with the position or size of the third mask. Only one third mask is illustrated in the drawing, but in reality, many more third masks may have already been acquired.

If there is a common region between the first mask and the third mask, the third mask can be corrected. The corrected lateral coordinate of the third mask can be set as the average of the lateral coordinate of the first mask and the third mask, and the corrected longitudinal coordinate of the third mask can be set as the longitudinal coordinate of the first mask. In addition, the corrected size of the third mask can be determined as the size of the larger mask from among the first mask and the third mask, and if the sizes of the first mask and the third mask are the same, the corrected size of the third mask can be determined as the size of any one from among the two masks.

As described above, fusion through multiple ultrasonic sensors can be performed by comparing the first mask acquired by any one of all ultrasonic sensors of the moving object 1000 with the fusion mask acquired by all ultrasonic sensors.

In addition, the fusion mask acquired using the direct and indirect waves of each ultrasonic sensor can be compared with the previously stored fusion mask. The previously stored fusion mask located between the newly acquired fusion mask and the ultrasonic sensor can be removed from the memory.

Figure 10:
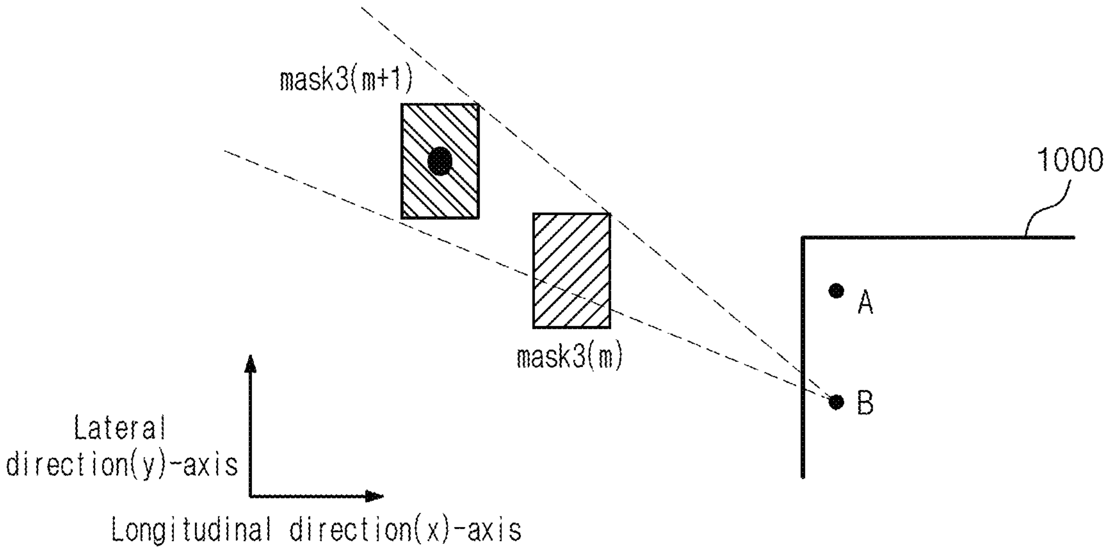
FIG. 10 is a diagram illustrating fusion mask removal according to the present disclosure.

FIG. 10 is a diagram illustrating fusion mask removal according to the present disclosure. A fusion mask (mask3 (m+1)) is newly acquired, and a fusion mask (mask3(m)) previously generated and stored between the fusion mask "mask3(m+1)" and the ultrasonic sensor (B) must be deleted. This is because the fusion mask (mask3(m)) is likely to be noise due to the movement of the moving object 1000. Here, the ultrasonic sensor B corresponds to an ultrasonic sensor that transmits direct and indirect ultrasonic waves used to acquire the fusion mask (mask3(m+1)).

Hereinafter, an occupancy grid map using multiple ultrasonic sensors will be described.

Conventionally, an occupancy grid map used to assign scores and probabilities to grid cells matched using the distance values of the sensors and to form a map has been used. The occupied grid map maps the grid to one of three values (i.e., occupied cell, free space, and unknown). The occupied cell is a grid with a high probability of object existence, the free space is a grid with a low probability of object existence, and "Unknown" represents an unknown grid.

However, the occupied grid map has a problem that, in a situation where multiple ultrasonic sensors and multiple objects are used, when the sensors recognize different objects, ghost occupied cells are generated and misrecognized.

Figure 11:
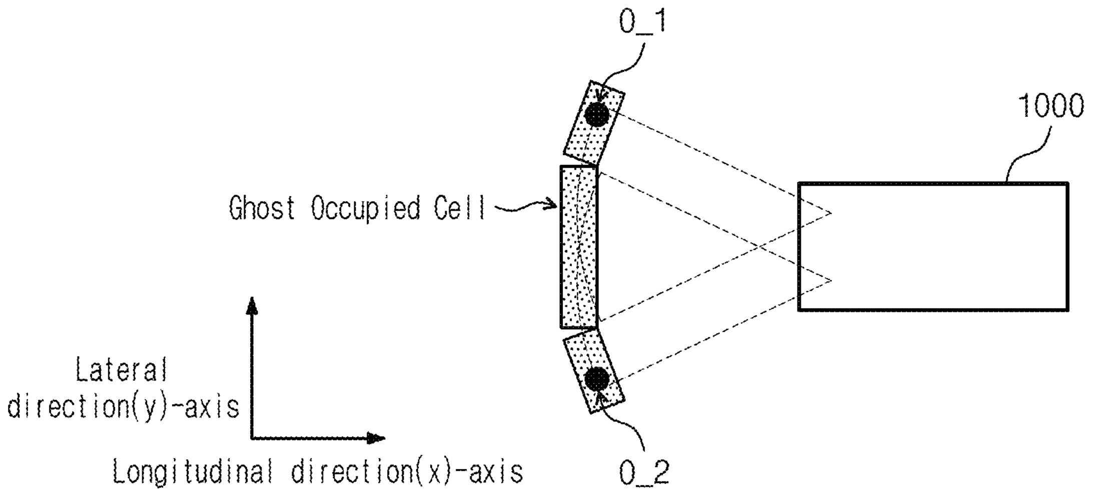
FIG. 11 is a diagram illustrating ghost occupied cells in object detection using a conventional ultrasonic sensor.

FIG. 11 shows a ghost occupied cell phenomenon in which, in a situation where there are actual objects (O_1, O_2), each sensor detects a different object, but it is logically determined to be one object.

In order to resolve this phenomenon, it is necessary to identify the combination of ultrasound waves that has a high probability of viewing the same object in a multi-sensor situation.

(1) Combination of Direct and Indirect Waves of Single Ultrasonic Sensor

Since the direct and indirect waves updated from a single ultrasonic sensor have the same FOV, the direct and indirect waves have a higher probability of imaging the same object than different sensor combinations. Assuming that the ultrasonic sensor B transmits ultrasonic waves, the direct wave reflection point and the indirect wave reflection point are likely to be in the FOV region.

Since the distance between the reflection point of the direct wave and the reflection point of the indirect wave is shorter than the distance between the direct wave reflection points of different ultrasonic sensors, the probability of imaging the same object is high.

In FIG. 5, the distance between the direct wave reflection point (N') of the ultrasonic sensor A and the direct wave reflection point (N) of the ultrasonic sensor B is "D*cos(θ)", and the distance between the indirect wave reflection point (M) of the ultrasonic sensor B and the direct wave reflection point (N) of the ultrasonic sensor B is "D/2*cos(θ)". In other words, the direct and indirect waves updated when signals are transmitted from a single sensor have a higher probability of imaging the same object than other sensor combinations.

(2) Combination of Direct Wave and Direct Wave of Single Ultrasonic Sensor

A combination of the direct wave and the direct wave of a single ultrasonic sensor increases the probability of imaging one object in a low-speed section. When the ultrasonic sensor moves from one position of A to another position of A', it may be difficult to assume that one object is seen as in the interpretation of different ultrasonic sensors because the FOVs are different from each other. However, in the case of a low speed, the change in position of the ultrasonic sensor during one ultrasonic cycle is small, and at speeds below 10 kph, the change in position of the ultrasonic sensor is smaller than the distance between the sensor and another sensor.

In conclusion, the combinations with the highest probability (P) of imaging the same object are listed in order of probability magnitude as follows:

$$P(\text{combination of direct and indirect waves of a single sensor}) > P(\text{combination of direct and direct waves of a single sensor}) > P(\text{combination of other sensors})$$

The reason for this order of magnitude is, as explained above, that the distance between the direct and indirect wave reflection points of a single sensor is denoted by "D/2*cos (θ)" (distance M~N), the distance between the direct wave of a single sensor and the direct wave reflection point <D (distance traveled by a vehicle during one ultrasonic cycle at 10 kph or less), the distance between the direct waves of different sensors and the direct wave reflection point is denoted by "D*cos(θ) (distance N~N')".

Figure 12:
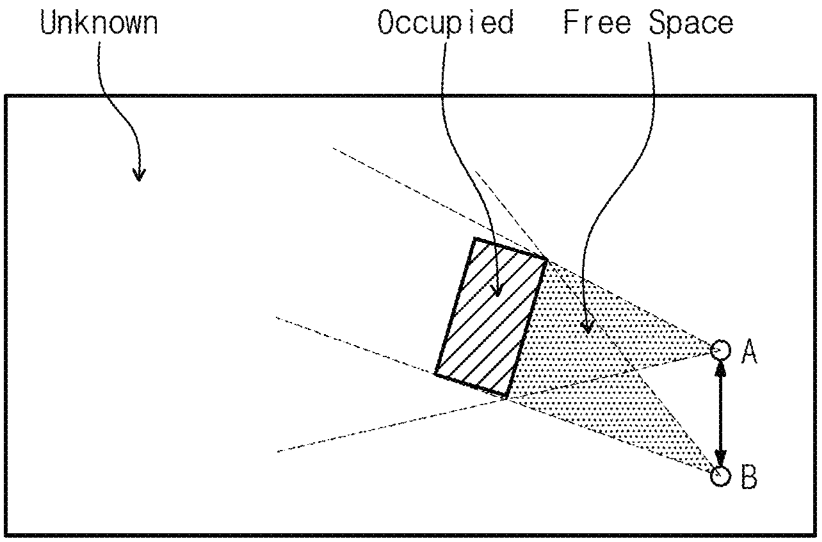
FIG. 12 is a diagram illustrating grid mapping by masking based on direct and indirect waves of a single ultrasonic sensor according to the present disclosure.

Accordingly, as shown in FIG. 12, grid mapping by masking based on direct and indirect waves of a single ultrasonic sensor is illustrated. The region between the mask (Occupied) and the sensor is mapped as 'Free Space', and only the inside of the mask is processed as 'Occupied'.

Figure 13:
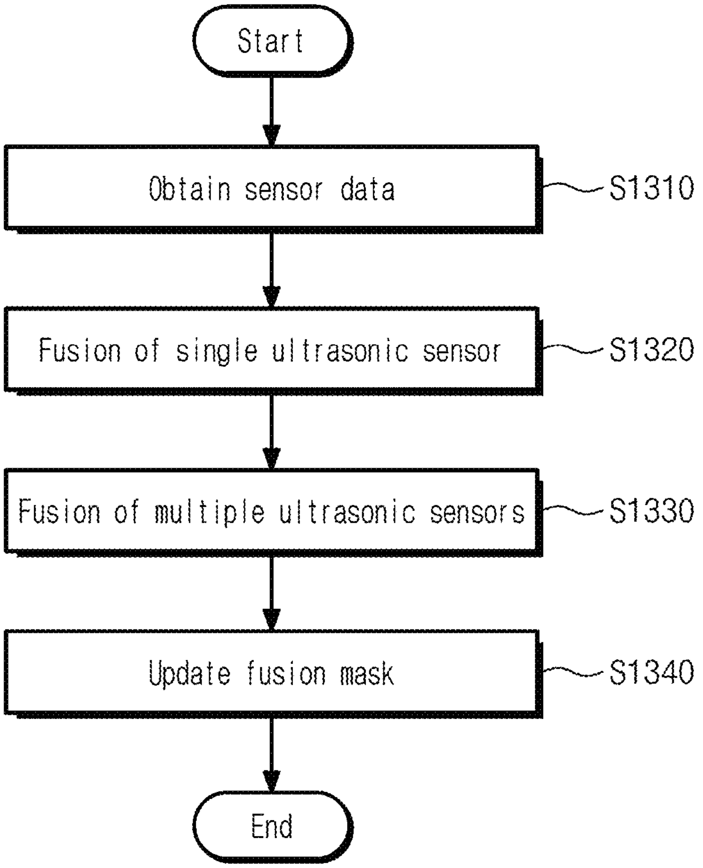
FIG. 13 is a flowchart illustrating a method for generating a surrounding map according to the present disclosure.

FIG. 13 is a flowchart illustrating a method for generating a surrounding map according to the present disclosure.

The method of FIG. 13 can be performed by a surrounding map generating device 1. The surrounding map generating device 1 will be described later with reference to FIG. 15. Hereinafter, the method will be simply described as being performed by the device 1.

The device 1 may obtain sensor data from the ultrasonic sensor (S1310). The device 1 may obtain sensor data from a plurality of ultrasonic sensors, and the sensor data may include a TOF value of the direct or indirect waves for ultrasonic waves transmitted by each ultrasonic sensor.

The device 1 may perform single ultrasonic sensor fusion using the sensor data of each ultrasonic sensor (S1320). Single ultrasonic sensor fusion is performed based on the masks of each ultrasonic sensor, for example, the first mask and the second mask, and does not utilize the masks of other ultrasonic sensors. Single ultrasonic sensor fusion will be described with reference to FIGS. 7 and 8.

The device 1 may perform multi-ultrasonic sensor fusion (S1330). The multi-ultrasonic sensor fusion can utilize masks of different ultrasonic sensors.

For example, the multi-ultrasonic sensor fusion can be designed to fuse a mask ("first mask") obtained through direct and indirect waves of a first ultrasonic sensor and a fusion mask ("second fusion mask") of a second ultrasonic sensor. If the positions or sizes of the first mask and the second fusion mask are within an error range, the second fusion mask can be corrected. For multi-ultrasonic sensor fusion, refer to FIG. 9.

The device 1 may update the fusion mask (S1340). As one method of updating the fusion mask, this method can be performed by comparing the fusion mask of the first ultrasonic sensor with the fusion mask of the second ultrasonic sensor, as illustrated in FIG. 10. In addition, if one fusion mask is located on the path between another fusion mask and the ultrasonic sensor, the fusion mask may be deleted from the surrounding map of the moving object 1000.

Figure 14:
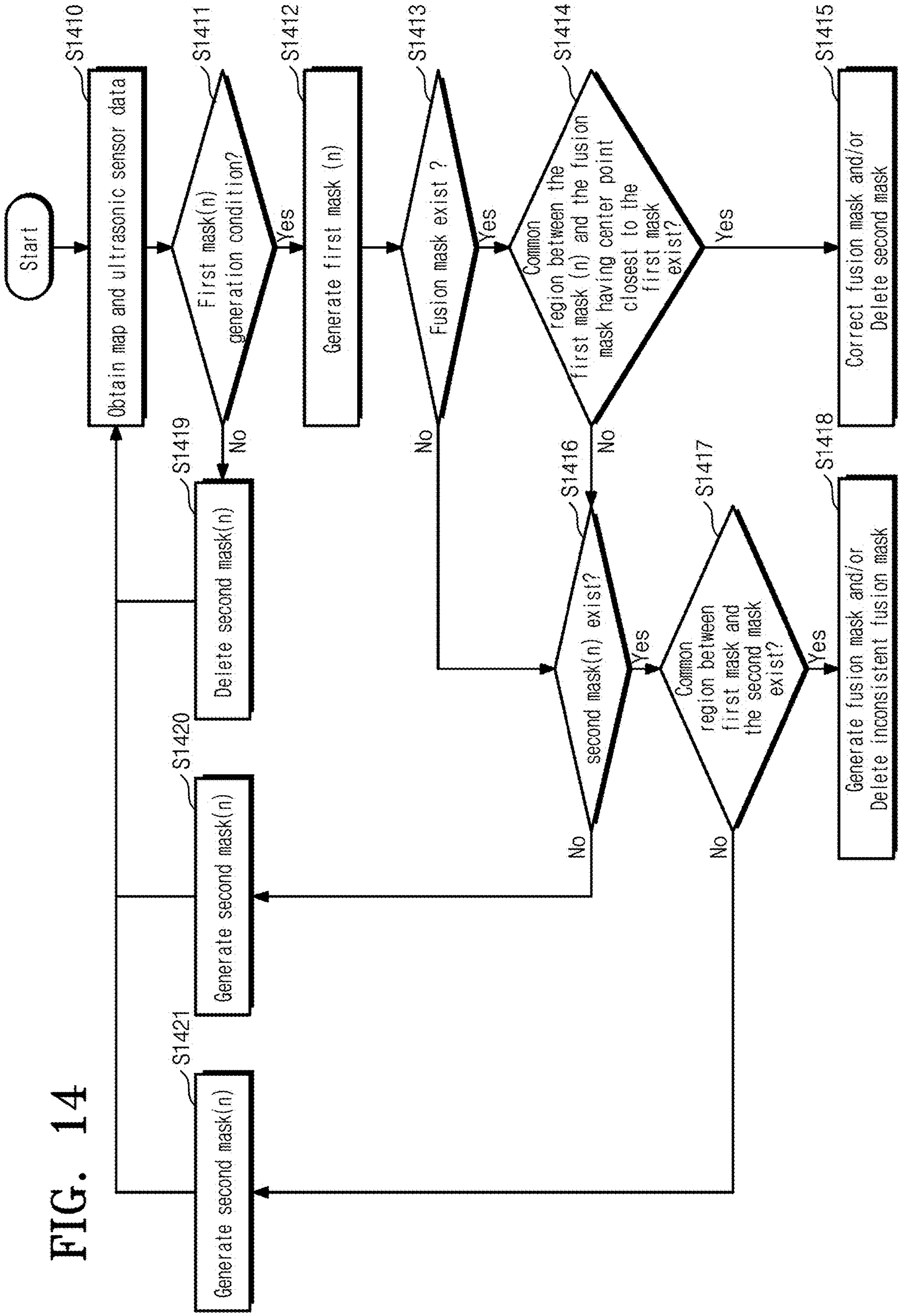
FIG. 14 is a flowchart illustrating a method for generating a surrounding map according to the present disclosure.

FIG. 14 is a flowchart illustrating a method for generating a surrounding map according to the present disclosure.

The method of FIG. 14 can be performed by the surrounding map generating device 1. The surrounding map generating device 1 will be described later with reference to FIG. 15. Hereinafter, the method will be simply described as being performed by the device 1.

FIG. 14 illustrates the device 1's operation in which sensor data of a single ultrasonic sensor is newly obtained (i.e., according to the cycle). Therefore, the device 1 may perform the procedure illustrated in FIG. 14 for each of the ultrasonic sensors simultaneously or in parallel. However, the map to be described below may include fusion masks acquired from all ultrasonic sensors, and the map can be updated according to a cycle.

The device 1 may acquire ultrasonic sensor data acquired from the ultrasonic sensor and a map (S1410).

The map refers to a database that stores fusion masks acquired by sensor data of all ultrasonic sensors. The map additionally corresponds to a database that stores a second mask of the corresponding ultrasonic sensor. As described above, the second mask may include a predicted mask expected based on a first mask indicating a measurement value obtained through the direct and indirect ultrasonic waves. The predicted mask may be expected in the next ultrasonic cycle based on the driving information of the moving object 1000.

The device 1 may determine whether the conditions for generating the first mask are satisfied based on the sensor data of the individual ultrasonic sensors (S1411). The above-described conditions are used to determine whether generation of the first mask is possible from a single ultrasonic sensor. For example, whether an intersection between the direct wave and the indirect wave of each ultrasonic sensor is formed can be formed may be used as the corresponding condition.

The device 1 can generate a first mask (S1412).

The device 1 can determine whether a fusion mask exists in the acquired map (S1413). That is, the device 1 may be used to determine whether multi-ultrasonic sensor fusion is possible.

Since the fusion mask exists in the acquired map, the device 1 can determine whether a common region exists between the first mask generated above and the fusion mask having a center point closest to the first mask (S1414).

Since a common region exists between the first mask and the fusion mask, the device 1 can correct the corresponding fusion mask in the map (S1415). For correction of the fusion mask, refer to FIG. 9 and a detailed description thereof.

In addition, if there is a second mask based on the first mask, the device 1 can delete the second mask. In terms of "ultrasonic cycle", the "second mask" means the second mask, which is a predicted value based on the first mask acquired in the previous ultrasonic cycle.

In S1413, since the acquired map does not have a fusion mask, the device 1 can determine whether the second mask based on the first mask exists (S1416). In terms of "ultrasonic cycle", the "second mask" means the second mask, which is a predicted value based on the first mask acquired in the previous ultrasonic cycle.

As the second mask exists, the device 1 may determine whether there is a common region between the first mask and the second mask (S1417). This procedure is used to determine whether single ultrasonic sensor fusion is possible.

As the common region between the first mask and the second mask exists, the device 1 can fuse the first mask and the second mask to generate a fusion mask (S1418). The generated fusion mask can be stored in the map. For the generation of the fusion mask, refer to FIGS. 7 to 8 and descriptions thereof.

In addition, when another fusion mask on the map lacks consistency with the generated fusion mask, the device 1 may be configured to delete the inconsistent fusion mask from the map. As illustrated and described in FIG. 10, the term 'consistency' denotes that no other fusion mask exists between the newly generated or stored fusion mask and the corresponding ultrasonic sensor. If there is another fusion mask positioned between the newly generated or stored fusion mask and the corresponding ultrasonic sensor, the fusion mask may be expressed as not being consistent with the new fusion mask.

In S1417, since there is no common region between the first mask and the second mask, the device 1 may delete the second mask from the map and may generate the second mask based on the first mask (S1421).

In S1416, when the second mask does not exist, the device 1 may generate the second mask based on the first mask (S1420).

In S1411, since the condition for generating the first mask is not established, the device 1 can delete the second mask stored in the map (S1419). This is because the first mask acquired in the previous ultrasonic cycle is considered to correspond to noise.

Figure 15:
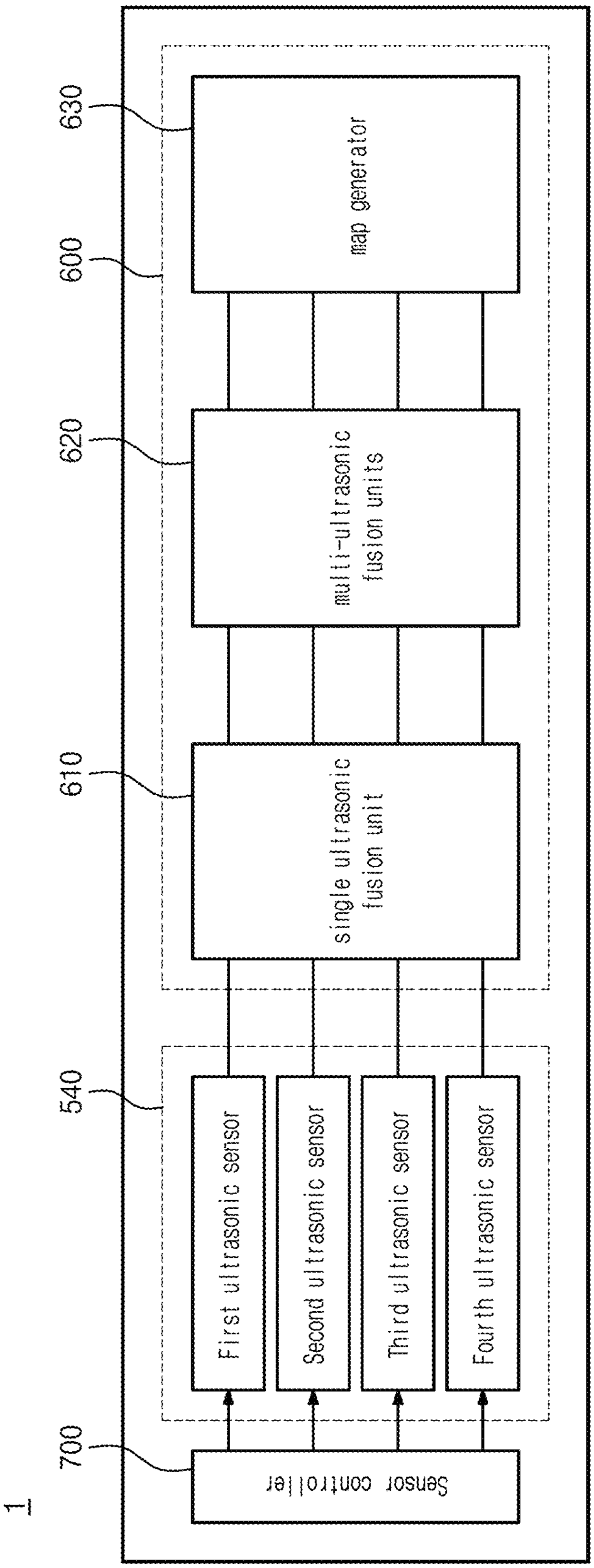
FIG. 15 is a block diagram illustrating an apparatus for generating a surrounding map according to the present disclosure.

FIG. 15 is a block diagram illustrating an apparatus for generating a surrounding map according to the present disclosure.

Referring to FIG. 15, the surrounding map generating device 1 may include a controller 600 configured to perform generation of a surrounding map, an ultrasonic sensor 540, and a sensor controller 700.

The sensor controller 700 may control the ultrasonic sensor 540. The sensor controller 700 may adjust or tune the characteristics of ultrasonic waves transmitted from the ultrasonic sensor 540. In addition, the sensor controller 700 can control the ultrasonic transmission time point of the ultrasonic sensor 540.

The controller 600 may include a single ultrasonic fusion unit 610, a multi-ultrasonic fusion unit 620, and a map generator 630. In addition, the controller may be configured to generate a mask corresponding to an object around the moving object 1000 using data acquired by the ultrasonic sensor 540. The mask is information corresponding to a space estimated to be occupied by the object, and can be expressed in a two-dimensional (2D) form.

The controller 600 may be configured to generate a fusion mask using the first mask acquired using each ultrasonic sensor and the second mask indicating the predicted mask corresponding to the first mask acquired in the previous cycle. Here, the first mask may be acquired based on the intersection of the direct wave and the indirect wave of each ultrasonic sensor. In addition, the second mask may be acquired based on the first mask (or information thereof) and the driving information of the moving object 1000. The driving information of the moving object 1000 may include a driving speed, a driving direction, a moving distance, etc.

In addition, the controller 600 may be configured to correct a fusion mask among the fusion masks for all ultrasonic sensors of the ultrasonic sensor 540 that has a common region with the first mask. When there are multiple fusion masks having a common region, the closest fusion mask may be set to be corrected.

When there is no fusion mask stored in the map, a common region between the first mask and the second mask exists, so that the controller 600 may be configured to generate a fusion mask based on the common region between the first mask and the second mask.

Alternatively, the controller 600 may be configured to generate a fusion mask based on the common region between the first mask and the second mask because the common region exists between the first mask and the second mask, and if the fusion mask between the generated fusion mask and the ultrasonic sensor related to the first mask is prestored, the controller 600 may be configured to delete the prestored fusion mask.

The controller 600 may be configured to delete the second mask as the common region between the first mask and the second mask does not exist; and may be configured to obtain a new second mask based on the driving information of the first mask and the moving object 600.

The controller 600 may be configured such that the corrected fusion mask has the longitudinal coordinates of the first mask as the longitudinal coordinate, and has the average of the lateral coordinate of the first mask and the second mask as the lateral coordinate.

For details related to the device 1 not described with reference to FIG. 15, reference may be made to the description related to FIGS. 3 to 14, and the content can be applied to the device 1 of FIG. 15.

Meanwhile, according to another embodiment of the present disclosure, a moving object 1000 including the above-described device 1 is proposed. The moving object includes all devices capable of movement, such as vehicles, robots, aircraft, and the like.

Although the above-described embodiments of the present disclosure have disclosed that the device (or apparatus) for controlling a surrounding map and components included therein perform such control for convenience of description, the device (or apparatus) and the components belonging thereto are names only and the scope of rights is not dependent thereon.

In other words, the proposed technology of the present disclosure may be performed by processors or devices having names other than the control device. In addition, the method, scheme, or the like described above may be performed by software or code readable by a computer or other machine or device for autonomous parking control or surrounding map generation.

For content related to the device 1 not described with reference to FIG. 15, reference may be made to the descriptions related to FIGS. 3 to 14, and the content thereof may be applied to the device 1 of FIG. 15.

Meanwhile, as another embodiment of the present invention, a moving object 1000 including the above-described device 1 is proposed. The moving object includes all devices capable of movement, such as vehicles, robots, and aircraft.

In the above specification, the "device" for generating a surrounding map or each component included therein is described as performing control, but the "device" and the components included therein are only names and the scope of rights is not dependent on thereon.

Although the above-described embodiments of the present disclosure have disclosed that the device (or system) for generating a surrounding map, and components included the device or system perform such control for convenience of description, the device (or system) and the components belonging thereto are names only and the scope of rights is not dependent thereon.

In other words, the proposed technology of the present disclosure may be performed by devices having names other than the processor, controller, etc. In addition, the method, scheme, or the like described above may be performed by software or code readable by a computer or other machine or device for autonomous parking control or surrounding map generation.

In addition, as another aspect of the present disclosure, the operation of the proposed technology described above may be provided as code that may be implemented, realized, or executed by a "computer" (a generic concept including a system on chip (SoC) or a (micro) processor) or a computer-readable storage medium, a computer program product, or the like storing or containing the code. The scope of the present disclosure is extendable to the code or the computer-readable storage medium or the computer program product storing or containing the code.

Detailed descriptions of preferred embodiments of the present disclosure disclosed as described above have been provided such that those skilled in the art may implement and realize the present disclosure.

Although the present disclosure has been described above with reference to preferred embodiments, those skilled in the art will understand that various modifications and changes can be made to the present disclosure set forth in the claims below.

Accordingly, the present disclosure is not intended to be limited to the embodiments shown herein but is to be accorded the widest scope consistent with the principles and novel features disclosed herein.

As is apparent from the above description, the method and apparatus according to the embodiments of the present disclosure have the following effects.

The present disclosure may accurately determine information about objects or obstacles around a moving object.

In addition, the present disclosure may reduce misjudgments when detecting objects or obstacles around a moving object.

The present disclosure may remove noise from information about objects or obstacles around a moving object.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An apparatus for generating a map around a moving object through multi-object recognition using a plurality of ultrasonic sensors, the apparatus comprising:

a sensor unit detecting an object around the moving object, wherein the sensor unit includes the plurality of ultrasonic sensors; and a processor operatively connected to the sensor unit and configured to generate a mask corresponding to the object around the moving object using data obtained by the sensor unit, wherein the processor is configured to:

periodically obtain a first mask using a respective one of the plurality of ultrasonic sensors, generate a fusion mask using a first mask obtained in a current cycle and a second mask predicted using a first mask obtained in a previous cycle, for the respective one of the plurality of ultrasonic sensors; and correct a fusion mask having a common region with the first mask obtained in the current cycle from among fusion masks for all of the plurality of ultrasonic sensors.

2. The apparatus according to claim 1, wherein the processor is further configured to:

based on that there is no stored fusion mask, in response to that the first mask obtained in the current cycle and the second mask have a common region, generate a fusion mask based on the common region between the first mask obtained in the current cycle and the second mask.

3. The apparatus according to claim 1, wherein the processor is further configured to:

in response to that a common region between the first mask obtained in the current cycle and the second mask exists, generate a fusion mask based on the common region between the first mask obtained in the current cycle and the second mask; and based on that a fusion mask positioned between the generated fusion mask and an ultrasonic sensor related to the first mask obtained in the current cycle is pre-stored, delete the pre-stored fusion mask.

4. The apparatus according to claim 1, wherein:

the first mask is obtained based on an intersection of a direct wave and an indirect wave of a respective one of the plurality of ultrasonic sensors.

5. The apparatus according to claim 1, wherein the second mask is obtained based on the first mask obtained in the previous cycle and driving information of the moving object.

6. The apparatus according to claim 1, wherein the processor is further configured to:

in response to that there is no common region between the first mask obtained in the current cycle and a second mask, delete the second mask, and obtain a new second mask based on the first mask obtained in the current cycle and driving information of the moving object.

7. The apparatus according to claim 1, wherein the corrected fusion mask is configured to:

have longitudinal coordinate of the first mask obtained in the current cycle as longitudinal coordinate, and have an average of lateral coordinate of the first mask obtained in the current cycle and the fusion mask as lateral coordinate.

8. The apparatus according to claim 1, wherein the processor is further configured to:

based on that there are multiple fusion masks having the common region, correct a fusion mask closest to the first mask obtained in the current cycle among the multiple fusion masks.

9. A method for generating a map around a moving object through multi-object recognition using a plurality of ultrasonic sensors, the method comprising:

obtaining a map including sensor data of a first ultrasonic sensor from among the plurality of ultrasonic sensors and one or more fusion masks obtained from the plurality of ultrasonic sensors;

obtaining, by a processor, a first mask using the sensor data of the first ultrasonic sensor; and correcting, by the processor, a fusion mask having a common region with the first mask from among the one or more fusion masks obtained from the plurality of ultrasonic sensors, wherein the map includes a first fusion mask obtained from the first ultrasonic sensor, and the first fusion mask is generated by fusing a measured mask obtained using the sensor data of the first ultrasonic sensor and a predicted mask obtained from the measured mask.

10. A moving object having mobility, the moving object comprising:

an apparatus configured to generate a map around the moving object, wherein the apparatus includes:

a sensor unit detecting an object around the moving object, wherein the sensor unit includes a plurality of ultrasonic sensors; and a processor operatively connected to the sensor unit and configured to generate a mask corresponding to the object around the moving object using data obtained by the sensor unit, wherein the processor is further configured to:

periodically obtain a first mask using a respective one of the plurality of ultrasonic sensors, generate a fusion mask using a first mask obtained in the current cycle and a second mask predicted using a first mask obtained in a previous cycle, for the respective one of the rality of ultrasonic sensors; and correct a fusion mask having a common region with the first mask obtained in the current cycle from among fusion masks for all of the plurality of ultrasonic sensors.

11. The moving object according to claim 10, wherein the processor is further configured to:

based on that there is no stored fusion mask, in response to that the first mask obtained in the current cycle and the second mask have a common region, generate a fusion mask based on the common region between the first mask obtained in the current cycle and the second mask.

12. The moving object according to claim 10, wherein the processor is further configured to:

in response to that a common region between the first mask obtained in the current cycle and the second mask exists, generate a fusion mask based on the common region between the first mask obtained in the current cycle and the second mask; and based on that a fusion mask positioned between the generated fusion mask and an ultrasonic sensor related to the first mask obtained in the current cycle is pre-stored, delete the pre-stored fusion mask.

13. The moving object according to claim 10, wherein the processor is further configured to:

in response to that there is no common region between the first mask obtained in the current cycle and a second mask, delete the second mask, and obtain a new second mask based on the first mask obtained in the current cycle and driving information of the moving object.

14. The moving object according to claim 10, wherein the processor is further configured to:

based on that there are multiple fusion masks having the common region, correct a fusion mask closest to the first mask obtained in the current cycle among the multiple fusion masks.

15. The moving object according to claim 10, wherein the second mask is obtained based on the first mask obtained in the previous cycle and driving information of the moving object.

* * * * *